(12) United States Patent
Nowak

(10) Patent No.: US 6,588,053 B1
(45) Date of Patent: Jul. 8, 2003

(54) VACUUM TRAILER ASSEMBLY

(76) Inventor: Mike C. Nowak, 113 N. Stockman St., Elmore, MN (US) 56027

( * ) Notice: Subject to any disclaimer, the term of this patent is extended or adjusted under 35 U.S.C. 154(b) by 0 days.

(21) Appl. No.: 10/076,468

(22) Filed: Feb. 15, 2002

(51) Int. Cl.[7] .............................. A47L 5/00; E01H 1/08
(52) U.S. Cl. ..................... 15/340.1; 406/42; 406/113; 406/151; 56/12.8; 414/508
(58) Field of Search .................. 406/38, 39, 40, 406/41, 42, 43, 44; 414/508; 15/340.1, 340.2; 56/12.8, 12.9, 13.2, 30, 31, 13.1; 400/113, 151

(56) References Cited

U.S. PATENT DOCUMENTS

| | | | |
|---|---|---|---|
| 2,267,234 A | * 12/1941 | Garber | 414/508 |
| D153,673 S | 5/1949 | Elliotte | |
| 3,342,353 A | * 9/1967 | Davis | 414/345 |
| 3,778,865 A | 12/1973 | Schmidt et al. | |
| 4,218,226 A | * 8/1980 | Boozer | 96/414 |
| 4,227,893 A | * 10/1980 | Shaddock | 95/268 |
| 4,366,594 A | * 1/1983 | Hyams | 15/314 |
| 4,443,997 A | 4/1984 | Namdari | |
| 4,567,623 A | 2/1986 | Walton | |
| 4,868,948 A | * 9/1989 | Arnold | 15/340.1 |
| 5,226,757 A | * 7/1993 | Tarrant | 406/39 |
| 5,317,783 A | 6/1994 | Williamson | |
| 5,630,247 A | 5/1997 | Venia | |
| 5,685,687 A | * 11/1997 | Frye | 414/505 |

* cited by examiner

Primary Examiner—Joseph A. Dillon

(57) ABSTRACT

A vacuum trailer assembly for collecting and disposing of debris. The vacuum trailer assembly includes a frame having a hitch portion and a trailer portion. The trailer portion has a plurality of wheels for supporting the frame. The hitch portion is designed for coupling to a vehicle. A vacuum assembly is coupled to the frame. The vacuum assembly includes a flexible intake tube for sucking debris into the vacuum assembly. The vacuum assembly has a discharge tube for expelling debris from the vacuum assembly. A collection bin is coupled to the frame. The collection bin is positioned whereby debris expelled from the discharge tube is collected in the collection bin. A stand assembly is coupled to the frame. The stand assembly includes a support panel designed for supporting a person thereon whereby the person can manipulate the intake tube to collect debris from an area surrounding the frame.

12 Claims, 6 Drawing Sheets

VACUUM TRAILER ASSEMBLY

BACKGROUND OF THE INVENTION

1. Field of the Invention

The present invention relates to leaf collection boxes and more particularly pertains to a new vacuum trailer assembly for collecting and disposing of debris.

2. Description of the Prior Art

The use of leaf collection boxes is known in the prior art. U.S. Pat. No. 5,630,247 describes a system for collecting leaves. Another type of leaf collection boxes is U.S. Pat. No. 5,317,783 having a vacuum trailer for collecting litter in cut and uncut grass areas. U.S. Pat. No. 4,443,997 has an apparatus for leaf and grass vacuuming and compaction in a bag. U.S. Pat. No. 4,567,623 has a collection apparatus for collecting leaves and debris into a bag for disposal. U.S. Pat. No. 3,778,865 has an attachment for coupling to the front of a vehicle and picking up grass and dirt and transferring them to the rear of the vehicle. U.S. Pat. No. Des. 153,673 shows a vacuum leaf loader.

While these devices fulfill their respective, particular objectives and requirements, the need remains for a system that has certain improved features allowing for collection and disposal of collected debris without the need of bags or physical removal of the debris by the user.

SUMMARY OF THE INVENTION

The present invention meets the needs presented above by providing a collection bin having a hydraulic mechanism for tilting the collection bin to dispose of the debris.

Still yet another object of the present invention is to provide a new vacuum trailer assembly that facilitates collection of leaves and debris.

Even still another object of the present invention is to provide a new vacuum trailer assembly that facilitates disposal of the collected debris and leaves.

To this end, the present invention generally comprises a frame having a hitch portion and a trailer portion. The trailer portion has a plurality of wheels for supporting the frame. The hitch portion is designed for coupling to a vehicle. A vacuum assembly is coupled to the frame. The vacuum assembly includes a flexible intake tube for sucking debris into the vacuum assembly. The vacuum assembly has a discharge tube for expelling debris from the vacuum assembly. A collection bin is coupled to the frame. The collection bin is positioned whereby debris expelled from the discharge tube is collected in the collection bin. A stand assembly is coupled to the frame. The stand assembly includes a support panel designed for supporting a person thereon whereby the person can manipulate the intake tube to collect debris from an area surrounding the frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
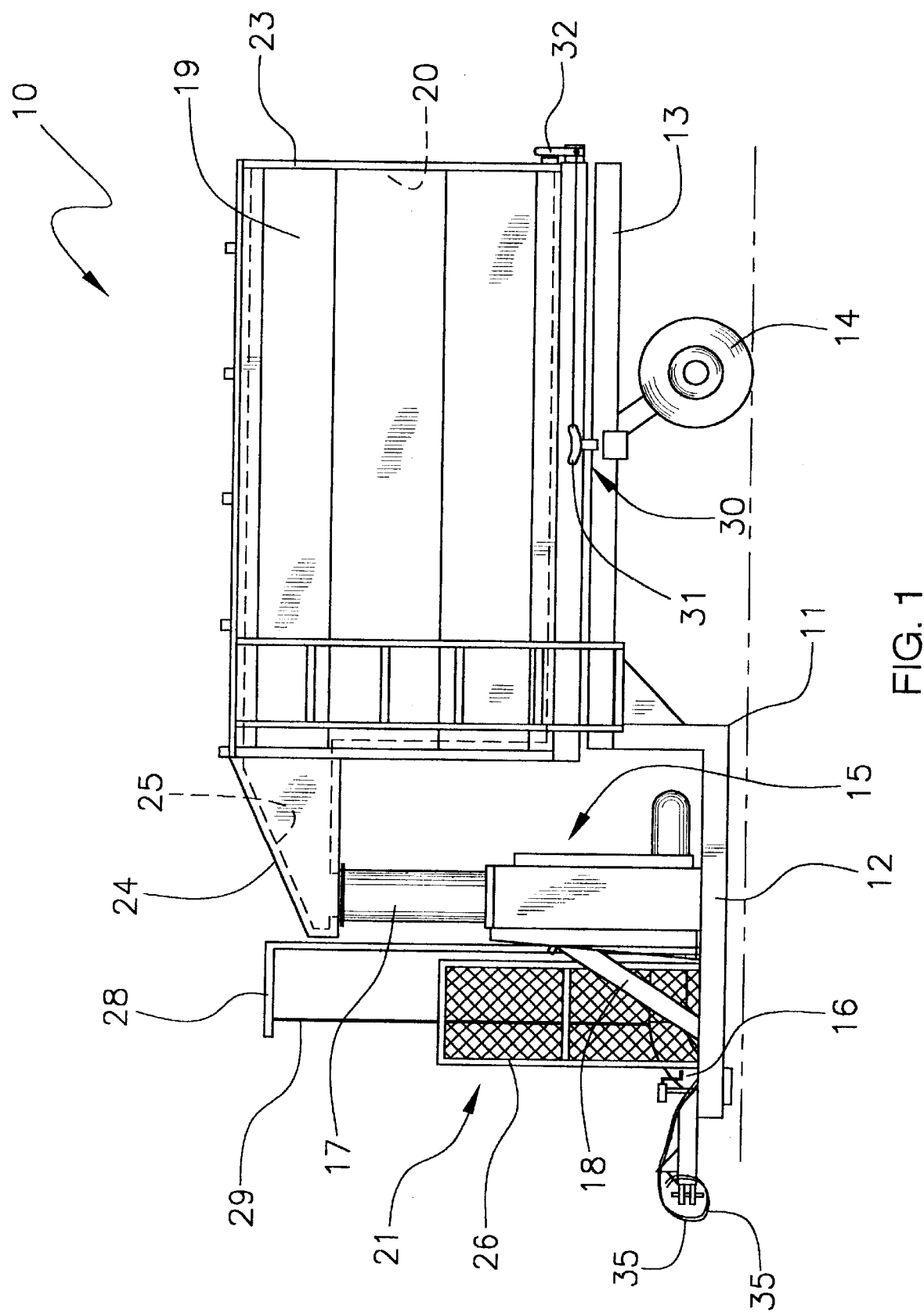
FIG. 1 is a side view of a new vacuum trailer assembly according to the present invention.
Figure 2:
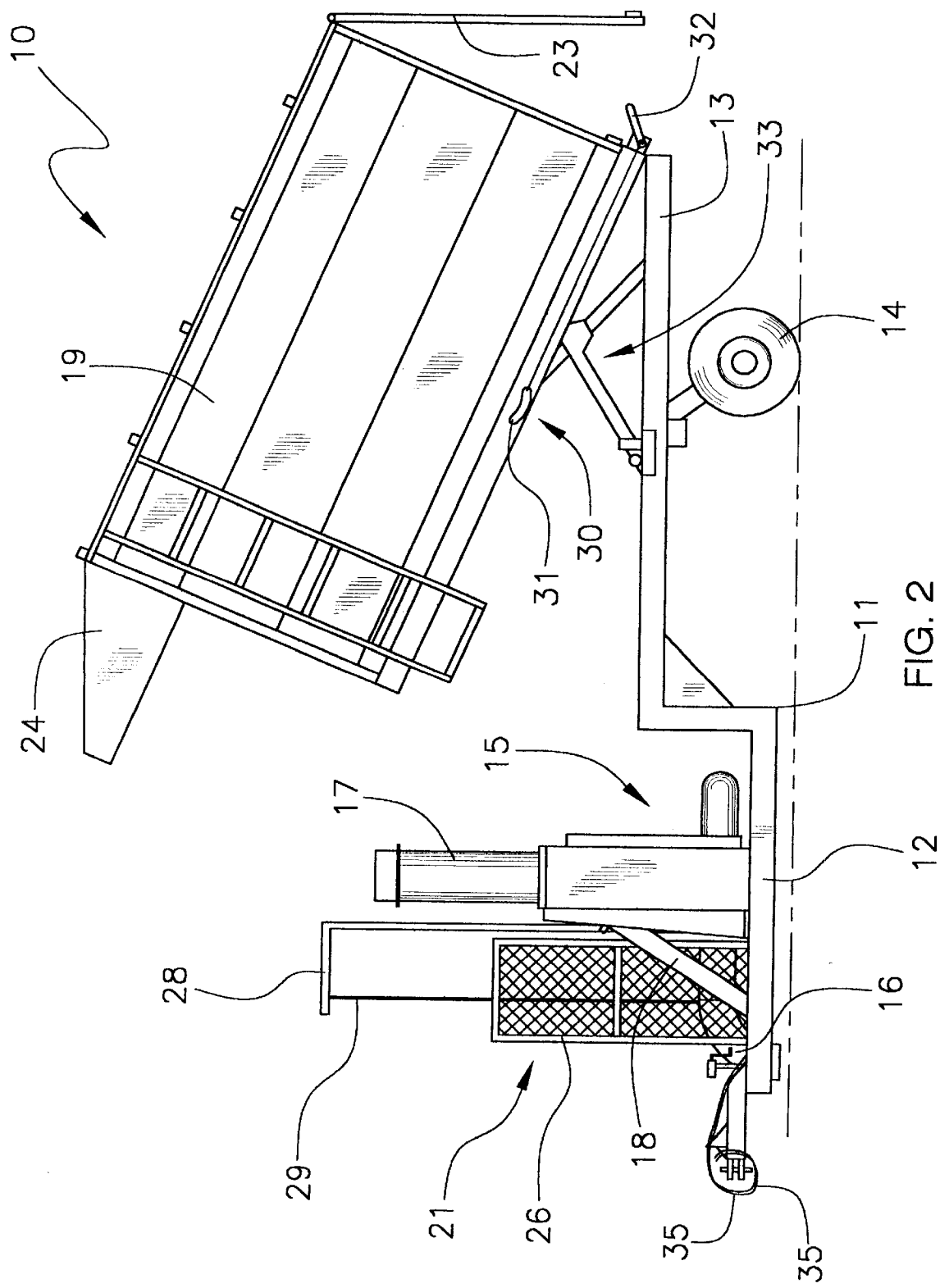
FIG. 2 is a side view of the present invention showing the collection bin in a pivoted position.
Figure 3:
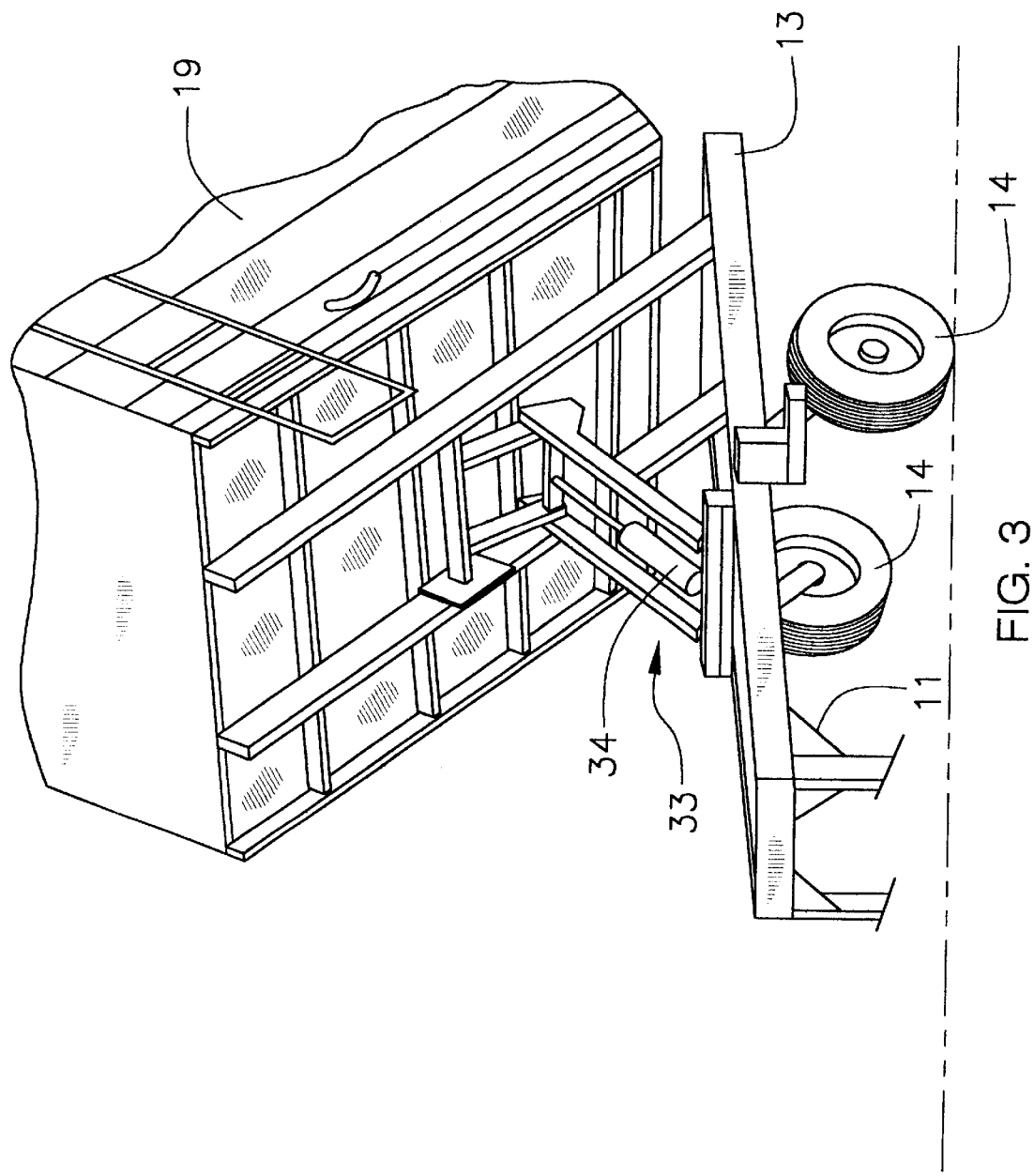
FIG. 3 is a perspective view of the present invention showing the collection bin in a pivoted position.
Figure 4:
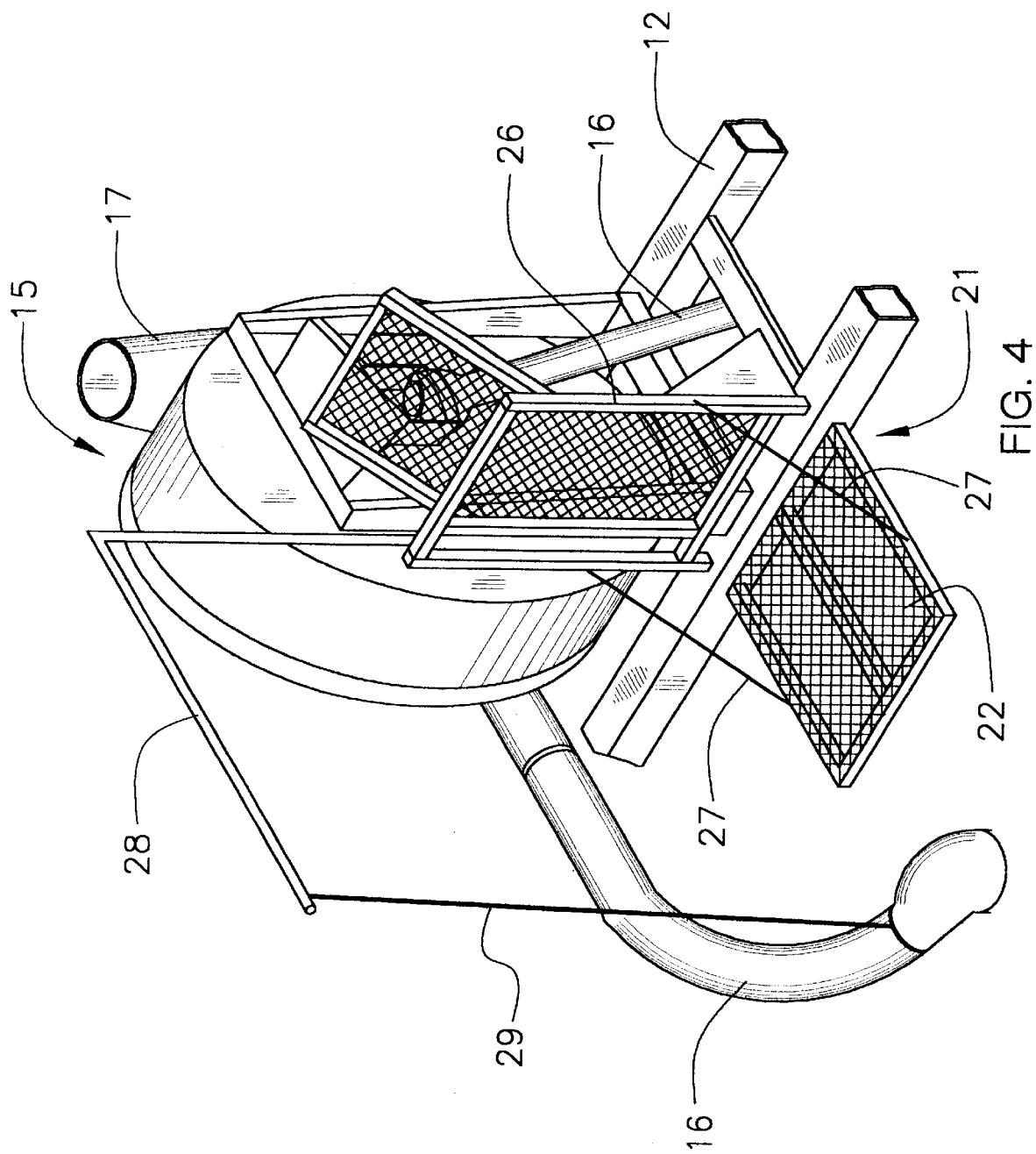
FIG. 4 is a left side perspective view of the vacuum assembly of the present invention.
Figure 5:
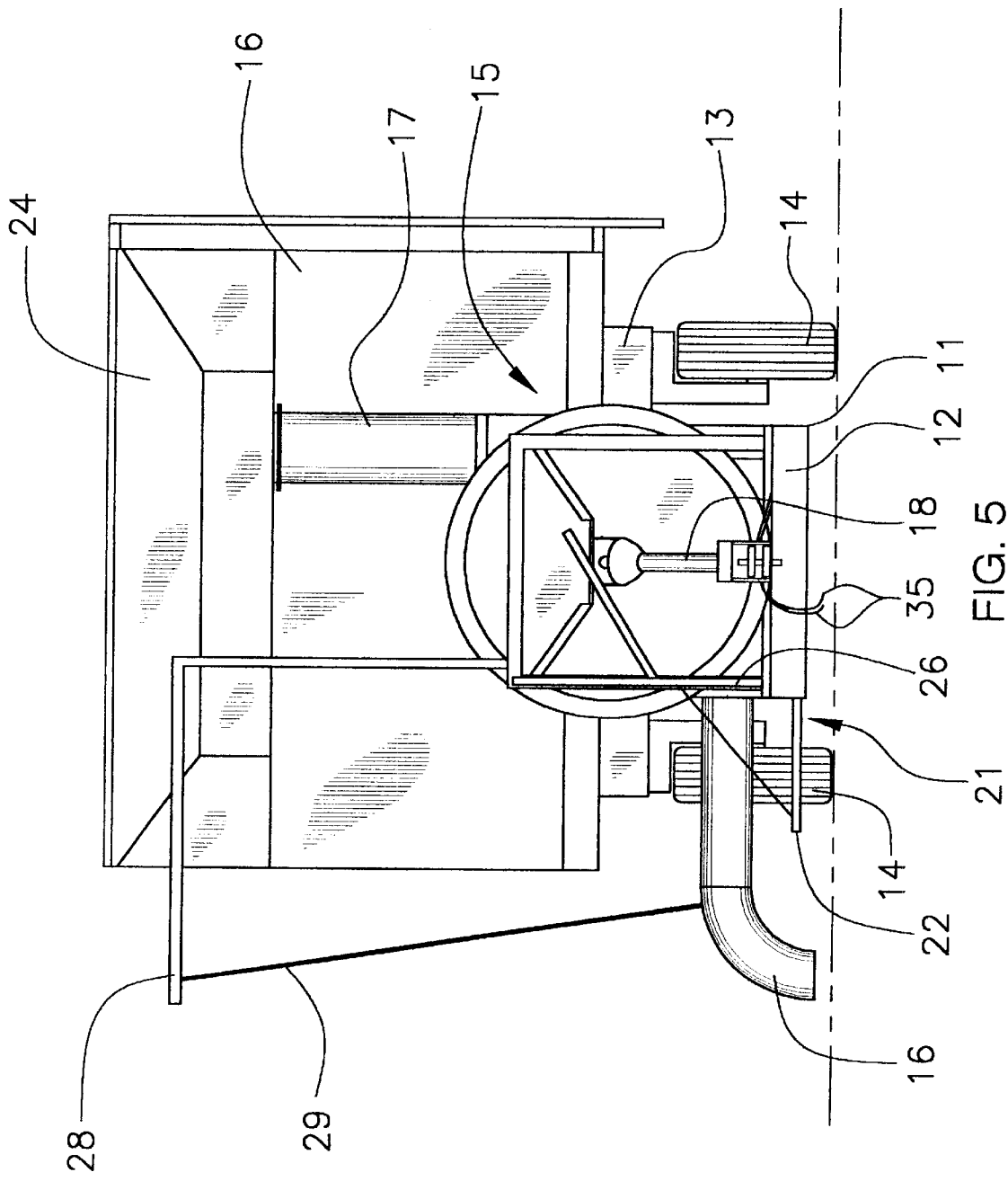
FIG. 5 is a front view of the present invention.
Figure 6:
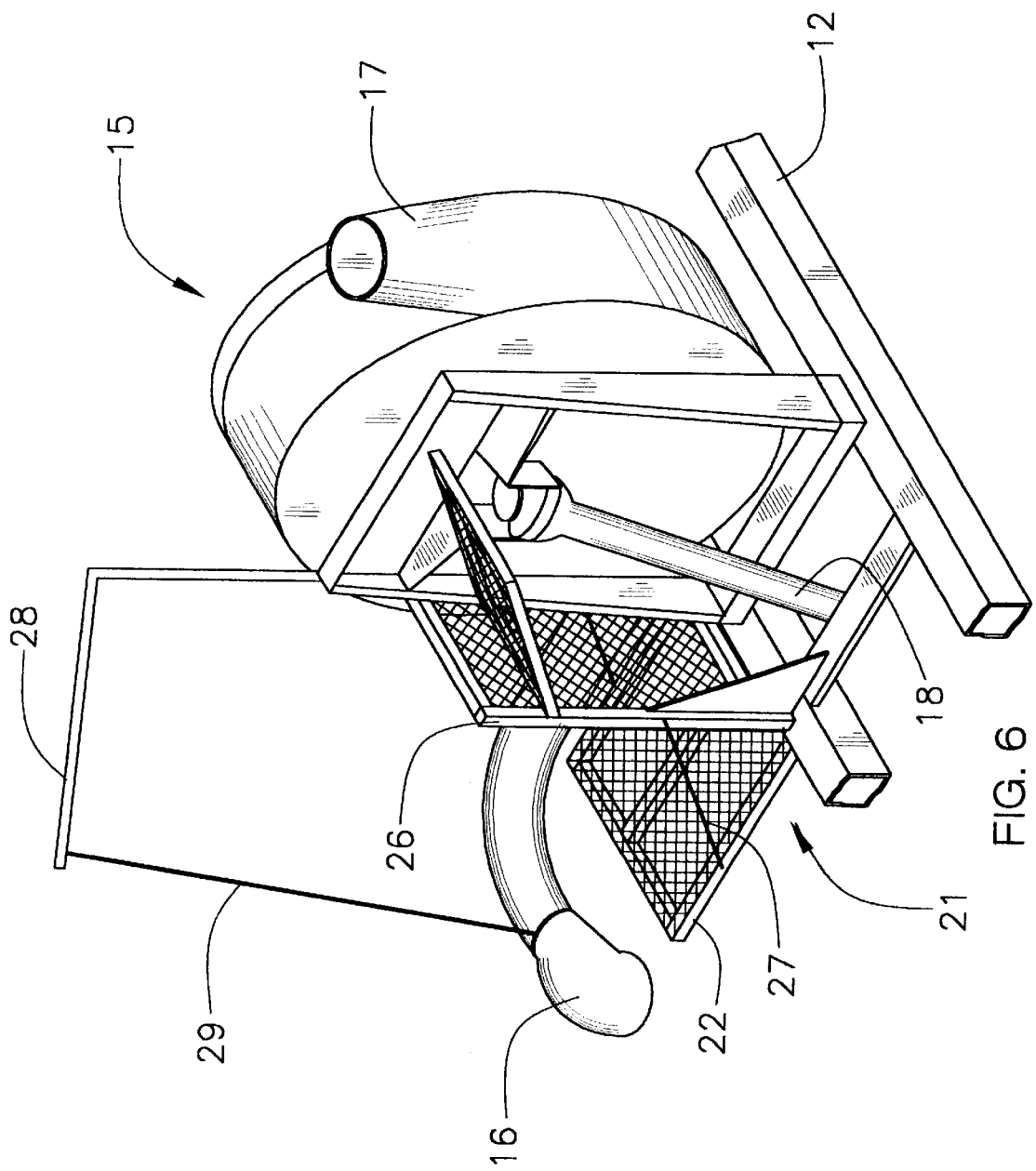
FIG. 6 is a right side perspective view of the present invention.

With reference now to the drawings, and in particular to FIGS. 1 through 6 thereof, a new vacuum trailer assembly embodying the principles and concepts of the present invention and generally designated by the reference numeral 10 will be described.

As best illustrated in FIGS. 1 through 6, the vacuum trailer assembly 10 generally comprises a frame 11 having a hitch portion 12 and a trailer portion 13. The trailer portion 13 has a plurality of wheels 14 for supporting the frame 11. The hitch portion 12 is designed for coupling to a vehicle.

A vacuum assembly 15 is coupled to the frame 11. The vacuum assembly 15 includes a flexible intake tube 16 for sucking debris into the vacuum assembly 15. The vacuum assembly 15 has a discharge tube 17 for expelling debris from the vacuum assembly 15. The discharge tube 17 is vertically oriented. The vacuum assembly 15 includes a power take off connection shaft 18 coupled to the frame 11 whereby the power take off connection shaft 18 is designed for coupling to a power take off of the vehicle.

A collection bin 19 is coupled to the frame 11. The collection bin 19 is positioned whereby debris expelled from the discharge tube 17 is collected in the collection bin 19. The collection bin 19 has an open rear end 20.

A stand assembly 21 is coupled to the frame 11. The stand assembly 21 includes a support panel 22 designed for supporting a person thereon whereby the person can manipulate the intake tube 16 to collect debris from an area surrounding the frame 11.

An end gate 23 is coupled to a top of the collection bin 19 to cover the rear end of the collection bin 19. The end gate 23 is openable for facilitating removal of debris from the collection bin 19. A top of the end gate 23 is pivotally coupled to the collection bin 19. The collection bin 19 is pivotally coupled to the frame 11 whereby the collection bin 19 is tiltable on the frame 11 to open the end gate 23 and empty the collection bin 19.

A hood portion 24 is coupled to the collection bin 19 whereby the hood portion 24 extends forwardly from a front of the collection bin 19 to cover the discharge tube 17. The hood portion 24 has a slanted upper interior surface 25 whereby debris expelled from the dispensing tube is directed into the collection bin 19.

The stand assembly 21 includes a vertically oriented side panel 26 extending upwardly from the frame 11. The support panel 22 is pivotable between a storage position and a use position. At least one cable 27 extends between the side panel 26 and the support panel 22 for holding the support panel 22 in the use position.

An intake tube support arm 28 extends upwardly from the frame 11. A flexible intake tube cable 29 extends between the intake tube support arm 28 and the intake tube 16 for supporting a weight of the intake tube 16 while the intake tube 16 is manipulated to collect debris.

The vacuum assembly 15 is coupled to the hitch portion 12 of the frame 11. The hitch portion 12 of the frame 11 is offset from the trailer portion 13 whereby the hitch portion 12 is positioned at a lower elevation than the trailer portion 13 to prevent tipping of the frame 11 during emptying of the collection bin 19.

A cam lever assembly 30 is coupled to the collection bin 19. The cam lever assembly 30 includes a cam 31 positioned to be urged into a locking position by the frame 11 when the collection bin 19 is in an unpivoted position. The cam lever assembly 30 includes a locking member 32 operationally coupled to the cam 31 for preventing opening of the end gate 23 when the cam 31 is in the locking position. The locking member 32 is operationally coupled to the cam 31 whereby the locking member 32 permits opening of the end gate 23 when the collection bin 19 is pivoted.

A hydraulic mechanism 33 includes a ram 34 coupled between the frame 11 and the collection bin 19. The ram 34 is extendable from the frame 11 for pivoting the collection bin 19. Hydraulic lines 35 are operationally coupled to the hydraulic mechanism 33. The hydraulic lines 35 are designed for coupling to a hydraulic system of the vehicle whereby the collection bin 19 is tiltable using the hydraulic system of the vehicle.

In use, the user couples the frame 11 to the vehicle and couples the power takeoff connection shaft 18 to the power take off of the vehicle. The user can then stand on the support panel 22 while another person drives the vehicle. The user then manipulates the intake tube 16 to vacuum up debris. When the collection bin 19 is full the cam lever assembly 30 is actuated to permit the end gate 23 to pivot so that when the collection bin 19 is pivoted the debris slides out of the collection bin 19.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vacuum trailer assembly comprising:
   a frame having a hitch portion and a trailer portion, said trailer portion having a plurality of wheels for supporting said frame, said hitch portion being adapted for coupling to a vehicle;
   a vacuum assembly coupled to said frame, said vacuum assembly including a flexible intake tube for sucking debris into said vacuum assembly, said vacuum assembly having a discharge tube for expelling debris from said vacuum assembly;
   a collection bin coupled to said frame, said collection bin being positioned such that debris expelled from said discharge tube is collected in said collection bin; and
   a stand assembly coupled to said frame, said stand assembly including a support panel adapted for supporting a person thereon such that the person can manipulate said intake tube to collect debris from an area surrounding said frame.

2. The vacuum trailer assembly of claim 1, further comprising:
   said discharge tube being vertically oriented;
   a hood portion coupled to said collection bin such that said hood portion extends forwardly from a front of said collection bin to cover said discharge tube, said hood portion having a slanted upper interior surface whereby debris expelled from said dispensing tube is directed into said collection bin.

3. The vacuum trailer assembly of claim 1, further comprising:
   said stand assembly including a vertically oriented side panel extending upwardly from said frame;
   said support panel being pivotable between a storage position and a use position; and
   at least one cable extending between said side panel and said support panel for holding said support panel in said use position.

4. The vacuum trailer assembly of claim 1, further comprising:
   an intake tube support arm extending upwardly from said frame, a flexible intake tube cable extending between said intake tube support arm and said intake tube for supporting a weight of said intake tube while said intake tube is manipulated to collect debris.

5. The vacuum trailer assembly of claim 1, further comprising:
   said vacuum assembly being coupled to said hitch portion of said frame; and
   said hitch portion of said frame being offset from said trailer portion such that said hitch portion is positioned at a lower elevation than said trailer portion to prevent tipping of said frame during emptying of said collection bin.

6. The vacuum trailer assembly of claim 1, further comprising:
   said vacuum assembly including a power take off connection shaft coupled to said frame such that said power take off connection shaft is adapted for coupling to a power take off watchamacallit of the vehicle.

7. The vacuum trailer assembly of claim 1, further comprising:
   said collection bin having an open rear end;
   an end gate coupled to a top of said collection bin to cover said rear end of said collection bin; and
   said end gate being openable for facilitating removal of debris from said collection bin.

8. The vacuum trailer assembly of claim 7, further comprising:
   a top of said end gate being pivotally coupled to said collection bin;
   said collection bin being pivotally coupled to said frame whereby said collection bin is tiltable on said frame to open said end gate and empty said collection bin.

9. The vacuum trailer assembly of claim 8, further comprising:
   a cam lever assembly coupled to said collection bin, said cam lever assembly including a cam positioned to be urged into a locking position by said frame when said collection bin is in an unpivoted position, said cam lever assembly including a locking member operationally coupled to said cam for preventing opening of said end gate when said cam is in said locking position, said locking member being operationally coupled to said cam such that said locking member permits opening of said end gate when said collection bin is pivoted.

10. The vacuum trailer assembly of claim 8, further comprising:

a hydraulic mechanism including a ram coupled between said frame and said collection bin, said ram being extendable from said frame for pivoting said collection bin.

11. The vacuum trailer assembly of claim 10, further comprising:

hydraulic lines operationally coupled to said hydraulic mechanism, said hydraulic lines being adapted for coupling to a hydraulic system of the vehicle whereby said collection bin is tiltable using the hydraulic system of the vehicle.

12. A vacuum trailer assembly comprising:

a frame having a hitch portion and a trailer portion, said trailer portion having a plurality of wheels for supporting said frame, said hitch portion being adapted for coupling to a vehicle;

a vacuum assembly coupled to said frame, said vacuum assembly including a flexible intake tube for sucking debris into said vacuum assembly, said vacuum assembly having a discharge tube for expelling debris from said vacuum assembly;

a collection bin coupled to said frame, said collection bin being positioned such that debris expelled from said discharge tube is collected in said collection bin;

a stand assembly coupled to said frame, said stand assembly including a support panel adapted for supporting a person thereon such that the person can manipulate said intake tube to collect debris from an area surrounding said frame;

said collection bin having an open rear end;

an end gate coupled to a top of said collection bin to cover said rear end of said collection bin;

said end gate being openable for facilitating removal of debris from said collection bin;

a top of said end gate being pivotally coupled to said collection bin;

said collection bin being pivotally coupled to said frame whereby said collection bin is tiltable on said frame to open said end gate and empty said collection bin;

said discharge tube being vertically oriented;

a hood portion coupled to said collection bin such that said hood portion extends forwardly from a front of said collection bin to cover said discharge tube, said hood portion having a slanted upper interior surface whereby debris expelled from said dispensing tube is directed into said collection bin;

said stand assembly including a vertically oriented side panel extending upwardly from said frame;

said support panel being pivotable between a storage position and a use position;

at least one cable extending between said side panel and said support panel for holding said support panel in said use position;

an intake tube support arm extending upwardly from said frame, a flexible intake tube cable extending between said intake tube support arm and said intake tube for supporting a weight of said intake tube while said intake tube is manipulated to collect debris;

said vacuum assembly being coupled to said hitch portion of said frame;

said hitch portion of said frame being offset from said trailer portion such that said hitch portion is positioned at a lower elevation than said trailer portion to prevent tipping of said frame during emptying of said collection bin;

a cam lever assembly coupled to said collection bin, said cam lever assembly including a cam positioned to be urged into a locking position by said frame when said collection bin is in an unpivoted position, said cam lever assembly including a locking member operationally coupled to said cam for preventing opening of said end gate when said cam is in said locking position, said locking member being operationally coupled to said cam such that said locking member permits opening of said end gate when said collection bin is pivoted;

said vacuum assembly including a power take off connection shaft coupled to said frame such that said power take off connection shaft is adapted for coupling to a power take off of the vehicle;

a hydraulic mechanism including a ram coupled between said frame and said collection bin, said ram being extendable from said frame for pivoting said collection bin; and hydraulic lines operationally coupled to said hydraulic mechanism, said hydraulic lines being adapted for coupling to a hydraulic system of the vehicle whereby said collection bin is tiltable using the hydraulic system of the vehicle.

* * * * *